(12) United States Patent
Goknel et al.

(10) Patent No.: US 12,487,834 B2
(45) Date of Patent: Dec. 2, 2025

(54) EVENT LOGGING PROTOCOL CONNECTOR SYSTEMS AND METHODS

(71) Applicant: OPEN TEXT INC., Menlo Park, CA (US)

(72) Inventors: Niyazi Eray Goknel, Broxbourne (GB); Paul Fellner, Marchtrenk (AT); Johannes Mayr, Grieskirchen (AT); Aqil Ahmed, Milton Keynes (GB)

(73) Assignee: Open Text Inc., Menlo Park, CA (US)

( * ) Notice: Subject to any disclaimer, the term of this patent is extended or adjusted under 35 U.S.C. 154(b) by 152 days.

(21) Appl. No.: 18/071,331

(22) Filed: Nov. 29, 2022

(65) Prior Publication Data

US 2024/0176625 A1 May 30, 2024

(51) Int. Cl.
| | |
|---|---|
| *G06F 16/00* | (2019.01) |
| *G06F 9/445* | (2018.01) |
| *G06F 9/50* | (2006.01) |
| *G06F 9/54* | (2006.01) |
| *G06F 16/25* | (2019.01) |

(52) U.S. Cl.
CPC ........ *G06F 9/44505* (2013.01); *G06F 9/5072* (2013.01); *G06F 9/542* (2013.01); *G06F 16/254* (2019.01)

(58) Field of Classification Search
CPC .......... G06F 9/5072; G06F 2209/5022; G06F 2209/504; G06F 9/5005; G06F 9/505; G06F 9/5077; G06F 16/9035; G06F 21/31; G06F 2221/2141; G06F 9/5027; G06F 11/1471; G06F 11/2094; G06F 11/2097; G06F 11/3006; G06F 16/901; G06F 16/907; G06F 16/955; G06F 2201/815; G06F 2201/82; G06F 3/0619; G06F 3/065; G06F 3/0659; G06F 3/0673; G06F 21/56; G06F 11/3068; G06F 11/3072; G06F 16/2365; G06F 16/254; G06F 16/258; G06F 21/552; G06F 21/604; G06F 40/205; G06F 40/295; H04L 41/5006; H04L 41/5077; H04L 47/829; H04L 47/782; H04L 63/1416;
(Continued)

(56) References Cited

U.S. PATENT DOCUMENTS 9,960,928 B1 * 5/2018 Pope ................... H04N 21/4622
11,522,812 B1 * 12/2022 Thoppai ................ G06F 16/901
(Continued)

OTHER PUBLICATIONS

Office Action issued for U.S. Appl. No. 18/071,349 mailed Dec. 9, 2024, 11 pages.
(Continued)

*Primary Examiner* — Shyue Jiunn Hwa
(74) *Attorney, Agent, or Firm* — Sprinkle IP Law Group

(57) ABSTRACT

Embodiments provide systems and methods for logging events. A computer-implemented method, for example, includes a syslog connector providing a subscription to a cloud source that collects events from a plurality of data sources, the subscription comprising an event selection criterion, receiving event records from the cloud source according to the subscription, the received event records formatted according to a first format, transforming the event records received from the cloud source from the first format to syslog messages and storing, by the syslog connector, the syslog messages to a syslog data sink.

23 Claims, 6 Drawing Sheets

(58) Field of Classification Search
CPC ... H04L 63/1425; H04L 63/145; H04L 63/20; H04L 41/06; H04L 41/22; H04L 41/046
See application file for complete search history.

(56) References Cited

U.S. PATENT DOCUMENTS

| | | |
|---|---|---|
| 11,818,018 B1 | 11/2023 | Hsiao |
| 12,368,728 B2 | 7/2025 | Goknel et al. |
| 2012/0254313 A1 | 10/2012 | Fake |
| 2014/0096181 A1 | 4/2014 | Rivers |
| 2018/0048664 A1 | 2/2018 | Bray |
| 2019/0130009 A1 | 5/2019 | McLean |
| 2020/0106742 A1 | 4/2020 | Moore |
| 2020/0162308 A1 | 5/2020 | Makovsky |
| 2021/0067423 A1* | 3/2021 | Newman ............. H04L 41/5048 |
| 2023/0070608 A1 | 3/2023 | Sumien |
| 2024/0179154 A1 | 5/2024 | Goknel et al. |

OTHER PUBLICATIONS

Thatcher, E., "System Logging: Log Messages Format for your SIEM—RFC3164 or CEF?", Townsend Security Data Privacy Blog, retrieved from <<https://info.townsendsecurity.com/bid/55495/system-logging-log-messages-format-for-your-siem-rfc-3164-or-cef.>>, published May 7, 2012, 3 pages.

Notice of Allowance issued for U.S. Appl. No. 18/071,349, mailed Mar. 26, 2025, 7 pages.

\* cited by examiner

EVENT LOGGING PROTOCOL CONNECTOR SYSTEMS AND METHODS

TECHNICAL FIELD

Embodiments of the present disclosure relate to event logging of events that occur on computer systems. More particularly, embodiments relate to collecting events and using connectors to transform the events to another format. Even more particularly, some embodiments relate to collecting events and using connectors to transform the events to standardized formats.

BACKGROUND

Many operating systems and other software programs include message logging systems to log events that occur in the operating system or during the execution of other software. Syslog, described in "The Syslog Protocol," RFC 5424, Internet Engineering Task Force (IETF), Network Working Group (March 2009), which obsoleted "The BSD Syslog Protocol," RFC 3164, IETF, Network Working Group (RFC 3164) (August 2001), is a widely used standard for message logging.

In one traditional approach to collecting syslog messages from distributed endpoints in an enterprise, the enterprise will install syslog agents on each endpoint (device) to be monitored. Further, the enterprise deploys syslog collectors throughout its networks to gather syslog content from the agents. An enterprise can group endpoints for syslog message collection by providing a syslog collector for each group. In general, there is a syslog collector for each location (physical site or LAN) for which syslog content is to be collected. For example, an enterprise may deploy a syslog collector to each site of the enterprise so that each site has its own syslog collector to collect syslog messages from the syslog agents at the site. The syslog collectors forward the syslog messages to a syslog bridge, which forwards the messages to a syslog data sink.

This traditional approach is hardware intensive as it requires a collector for each location (or other grouping of endpoints). Moreover, each enterprise must deploy and manage its own system of collectors, bridges etc. Furthermore, the endpoint agents and collectors are specific to the syslog implementation of each enterprise, requiring that specific endpoint software be installed on each machine being monitored. That is, a generic agent cannot be used across enterprises.

SUMMARY

Embodiments of the present disclosure include systems, methods and computer program products for event logging. Even more particularly embodiments can collect various events at a first location and use connectors to transform the collected events to a standardized format at a second location. In a particular embodiment, a syslog connector transforms events formatted according to a first format into syslog messages. The syslog connector can be a universal syslog connector that can ingest events from a variety of endpoints and store the events to any configured syslog data sink. In a preferred embodiment, a cloud event collector is used to collect events from distributed computing devices. The cloud event collector provides events to an on-premises syslog connector using a first format (for example a proprietary format). The on-premises syslog connector transforms the events into syslog messages and sends the syslog messages to a configured syslog data sink. In this manner, an enterprise can employ a cloud architecture to collect events, while still being able to use existing analysis programs that rely on the syslog format to analyze the events.

One embodiment comprises a computer-implemented method that comprises providing, by a syslog connector, a subscription to a cloud source that collects events from a plurality of data sources. The subscription may include an event selection criterion. The method also includes receiving, by the syslog connector, event records from the cloud source according to the subscription, the received event records formatted according to a first format. The method also includes transforming, by the syslog connector, the event records received from the cloud source from the first format to syslog messages; and storing, by the syslog connector, the syslog messages to a syslog data sink. Other embodiments include corresponding computer systems, apparatus, and computer programs recorded on one or more computer storage devices, each configured to perform the actions of the methods.

Some embodiments include one or more of the following features. The syslog connector is an on-premises syslog connector. The event records are pushed from the cloud source to the syslog connector. The event records are pulled by the syslog connector from the cloud source. Storing the syslog messages to the syslog data sink includes sending a syslog file containing the syslog messages to the syslog data sink.

The computer-implemented method may include: receiving, by the syslog connector, an event logging configuration. The event logging configuration may include the event selection criterion and a data sink configuration for the syslog data sink. The event logging configuration further may include a polling interval and where the syslog connector polls the cloud source for additional event records according to the polling interval.

The computer-implemented method may include: establishing an event store for the subscription; evaluating a new event to determine that the new event is subscribed to according to the subscription; based on the determination that the new event is subscribed to according to the subscription, add an event record for the new event to the event store for the subscription as an unread event record; and sending the unread event record to the syslog connector and changing the unread event record to a read event record. In some embodiments, the unread event record is pushed to the syslog connector. In other embodiments, the syslog connector pulls unread event records.

Another general aspect of the present disclosure includes a computer program product that comprises a non-transitory, computer-readable medium storing thereon computer-executable instructions. The computer-executable instructions may include instructions for providing a subscription to a cloud source that collects events from a plurality of data sources. The subscription may include an event selection criterion. The computer-executable instructions may also include instructions for receiving event records from the cloud source according to the subscription, the received event records formatted according to a first format. The computer-executable instructions may also include instructions for transforming the received event records from the first format to syslog messages and storing the syslog messages to a syslog data sink.

Some embodiments include one or more of the following features. The event records are received from the cloud source because of being pushed from the cloud source. Storing the syslog messages to the syslog data sink includes sending a syslog file containing the syslog messages to the syslog data sink. The computer program product may include instructions for pulling the event records from the cloud source. The computer program product may include instructions for receiving an event logging configuration. The event logging configuration may include the event selection criterion and a data sink configuration for the syslog data sink. The event logging configuration further may include a polling interval. The computer program product may include instructions for polling the cloud source for new event records according to the polling interval.

Another general aspect includes an event logging system. The event logging system includes a first processor. The system also includes a first non-transitory, computer-readable medium storing thereon first computer-executable instructions that are executable by the first processor. The first computer-executable instructions may include instructions for providing a subscription to a cloud source that collects events from a plurality of data sources. The subscription may include an event selection criterion. The first computer-executable instructions may also include instructions for receiving event records from the cloud source according to the subscription, the received event records formatted according to a first format. The first computer-executable instructions may also include instructions for transforming the received event records from the first format to syslog messages and storing the syslog messages to a syslog data sink.

The event logging system also includes a second processor and a second non-transitory, computer-readable medium. The second non-transitory, computer-readable medium stores thereon second computer-executable instructions that are executable by the second processor. The second computer-executable instructions may include instructions for establishing an event store for the subscription. The second computer-executable instructions may also include instructions for determining that a new event is subscribed to according to the subscription. The second computer-executable instructions may include instructions for adding an unread event record for the new event to the event store for the subscription based on the determination that the new event is subscribed to according to the subscription. The second computer-executable instructions may include instructions sending the unread event record to the first processor and changing the unread event record to a read event record in the event store for the subscription.

The second computer-executable instructions may include instructions executable by the second processor for pushing the unread event record to the first processor. The second computer-executable instructions may include instructions executable by the second processor for sending the unread event record to the first processor responsive to the first processor pulling the unread event record. The first computer-executable instructions may include instructions executable by the first processor for pulling the unread event record.

Another general aspect includes a system for security event transformation. The system also includes a processor. The system also includes a non-transitory computer-readable medium. The system also includes stored instructions translatable by the processor for executing a security event transformer for receiving a plurality of security events, the security event transformer transforming each of the plurality of security events to a standard format to generate a plurality of formatted security events. The system also includes stored instructions translatable by the processor for executing a security event receiver for receiving the plurality of security events from an event collector, coupled to the security event transformer, the security event receiver forwarding the plurality of security events to the security event transformer. The system may further include stored instructions translatable by the processor for executing a security event transmitter, coupled to the security event transformer, for receiving the plurality of formatted security events from the security event transformer and transmitting the plurality of formatted security events to a security information and event management (SIEM) server. The security event receiver may further receive input for selecting one or more event types to receive from the event collector.

Some embodiments may include one or more of the following features. The system where the plurality of security events is pushed from the event collector to the security event receiver. The plurality of security events is fetched from the event collector by the security event receiver. The security event receiver further receives input for a fetch time interval, fetches events at every fetch time interval and forwards events to the security event transformer. The one or more event types may include endpoint events and the event collector collects a corpus of events from a plurality of endpoints coupled over a network to the event collector. The security event receiver receives the endpoint events. The event collector collects a corpus of events. The system may include a security event application programming interface (security API) coupled between the event collector and the security event receiver, the security API receiving the input for selecting one or more event types to receive from the event collector including one or more event subscriptions, each of the one or more event subscriptions describing attributes of events within the corpus of events to receive, transform and transfer to the SIEM server. The SIEM server is a plurality of SIEM servers, and the standard format is a universal event format capable of being processed by the plurality of SIEM servers.

Another general aspect includes a method for security event transformation. The method includes receiving input for selecting one or more event types to receive from an event collector.

The method also includes receiving, based on the one or more event types, a plurality of security events from the event collector. The method also includes transforming each of the plurality of security events to a standard format to generate a plurality of formatted security events. The method also includes transmitting the plurality of formatted security events to a security information and event management (SIEM) server.

Embodiments may include one or more of the following features. The SIEM server is a plurality of SIEM servers, and the standard format is a universal event format capable of being processed by the plurality of SIEM servers. The method where receiving the plurality of security events from the event collector further may include: pushing the plurality of security events from the event collector. Receiving the plurality of security events from the event collector further may include: fetching the plurality of security events from the event collector. Receiving input for selecting one or more event types to receive from an event collector further may include: receiving input for a fetch time interval; and fetching events from the event collector at every fetch time interval. The one or more event types may include endpoint events. The method may include: collecting, by the event collector, a corpus of events from a plurality of endpoints coupled over a network to the event collector; and receiving, based on the one or more event types, a plurality of security events from the event collector further may include receiving the endpoint events. Receiving input for selecting one or more event types to receive from an event collector further may include receiving input for one or more event subscriptions, each of the one or more event subscriptions describing attributes of events within the corpus of events. The method may also include receiving, based on the one or more event types and the one or more event subscriptions, a plurality of security events from the event collector.

Another general aspect includes a computer program product that includes a non-transitory, computer-readable medium storing instructions translatable by a processor for receiving input for selecting one or more event types to receive from an event collector. The product also stores instructions translatable by the processor for receiving, based on the one or more event types, a plurality of security events from the event collector. The product also includes instructions translatable by the processor for transforming each of the plurality of security events to a standard format to generate a plurality of formatted security events. The product also includes instructions translatable by the processor for transmitting the plurality of formatted security events to a security information and event management (SIEM) server.

Embodiments may include one or more of the following features. The computer program product where receiving the plurality of security events from the event collector further may include: pushing the plurality of security events from the event collector. Receiving the plurality of security events from the event collector further may include: fetching the plurality of security events from the event collector by the security event receiver. Receiving input for selecting one or more event types to receive from an event collector further may include: receiving input for a fetch time interval; and fetching events from the event collector at every fetch time interval. The one or more event types may include endpoint events. The computer program product may further include instructions translatable by the processor for collecting, by the event collector, a corpus of events from a plurality of endpoints coupled over a network to the event collector; and receiving, based on the one or more event types, a plurality of security events from the event collector further may include receiving the endpoint events. Receiving input for selecting one or more event types to receive from an event collector further may include receiving input for one or more event subscriptions, each of the one or more event subscriptions describing attributes of events within the corpus of events. The product may further comprise instructions translatable by the processor for receiving, based on the one or more event types and the one or more event subscriptions, a plurality of security events from the event collector.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Embodiments provide systems and methods for transforming and logging events. An event collector collects events from a variety of data sources. The events include, for example, events that occur during execution of an operating system or other software. Examples of events include, but are not limited to, endpoint events, web threat shield events, backup events, domain name server events, console events, status events, user events. Additional examples include, but are not limited to, kernel messages, user-level events, mail system events, daemon events, authentication events, line printer events, network news subsystem events, UUCP events, clock daemon events, FTP daemon events, NTP subsystem events, log audit events, log alert events, local facility events of various types. In event more particular embodiments, the event collector is a cloud-based event collector.

Embodiments provide systems and methods for transforming and logging events. An event collector collects events from a variety of data sources. The events include, for example, events that occur during execution of an operating system or other software. Examples of events include, but are not limited to, endpoint events, web threat shield events, backup events, domain name server events, console events, status events, user events. Additional examples include, but are not limited to, kernel messages, user-level events, mail system events, daemon events, authentication events, line printer events, network news subsystem events, UUCP events, clock daemon events, FTP daemon events, NTP subsystem events, log audit events, log alert events, local facility events of various types. In even more particular embodiments, the event collector is a cloud-based event collector.

Figure 1:
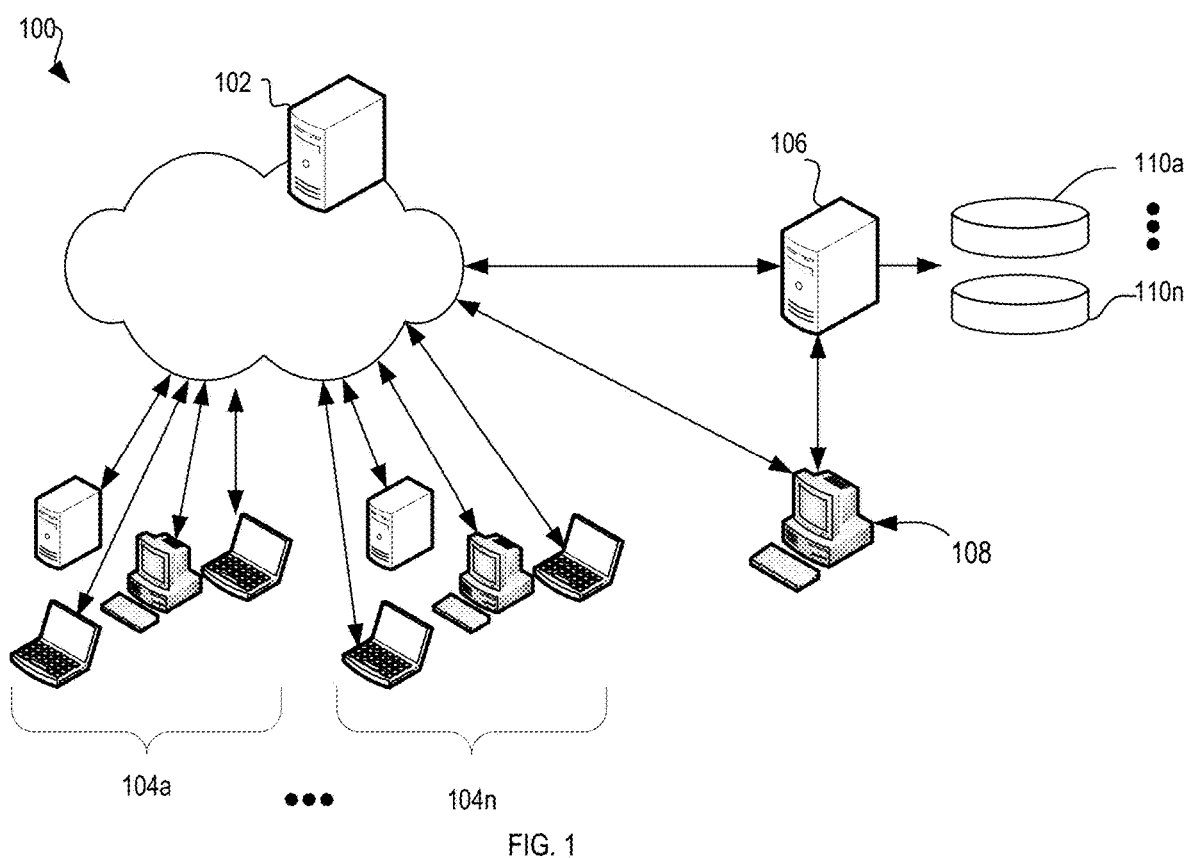
FIG. 1 is a diagrammatic representation of one embodiment of a system 100 for logging events.

FIG. 1 is a diagrammatic representation of one embodiment of a system 100 for logging events. System 100 includes a cloud platform 102 that receives events from data sources at sites 104a . . . 104n (generally sites 104). In a single tenant implementation, sites 104 belong to the same tenant. In a multi-tenant implementation, various sites are associated with different tenants, though a tenant may have more than one site. System 100 further includes an event logging protocol connector 106 that is configured with information to connect to and store information to data sinks (e.g., data sinks 110a . . . 110n are illustrated). In some embodiments, event logging protocol connector 106 is located on-prem of a customer utilizing the cloud platform 102 for events collection.

Cloud platform 102 collects event records from agents running on the endpoints (e.g., via an application programming interface (API)). The event record for each event is formatted according to a format used by cloud platform 102. Cloud platform 102 pushes event records to the event logging protocol connector or event logging protocol connector 106 fetches event records from cloud platform 102. Event logging protocol connector 106 transforms the event records received from cloud platform 102 to an output format and sends the event records, according to the output format, to a data sink.

In one embodiment, event logging protocol connector 106 is a syslog connector that translates event records from cloud platform 102 to a syslog format. In an even more particular embodiment, event logging protocol connector 106 is a universal syslog connector that is configurable to translate event records from cloud platform 102 to any syslog consumption device (data sink).

Event logging protocol connector 106 comprises a translation layer to translate event records received from cloud platform 102 to an output format (e.g., a syslog format). Event logging protocol connector 106 comprises an interface (e.g., one or more graphical user interfaces, command line interfaces, or other interfaces) to allow a user to configure the translation layer to transform data from the format used by cloud platform 102 for the event types to an output format and to configure the output format. In general, the format of event records from cloud platform 102 for each event type to which event logging protocol connector 106 can subscribe is known to the event logging protocol connector 106.

In one embodiment, event logging protocol connector 106 is a syslog connector that transforms events from the format provided by cloud platform 102 to a standardized syslog format. The format of syslog messages well known as defined in "The Syslog Protocol," RFC 5424, Internet Engineering Task Force (IETF), Network Working Group (RFC 5424) (March 2009), which is hereby fully incorporated by reference herein. An earlier version of the protocol is defined in "The BSD Syslog Protocol," RFC 3164, IETF, Network Working Group (RFC 3164) (August 2001), which is hereby fully incorporated by reference herein.

A syslog message includes a header and a (MSG). In some implementations, the syslog message includes a structured data payload. The header includes a string composed of print characters. In some embodiments, the header includes one or more of: a) PRI, a priority level; b) VERSION, a version number of the SYSLOG protocol; c) TIMESTAMP, a time stamp; d) HOSTNAME, a name of a host; e) APP-NAME, a name of an application; f) PROCID, an ID of a process; and e) MSGID, an ID of the message. The structured data payload includes of a series of structured elements, each of which includes a structured element name and parameter name/value pairs. The MSG is free-text, usually used for describing an event. In some cases, RFC 5424 references other RFCs by the IETF to further define the formats for specific parts of the syslog message. RFC 5424, RFC 3164 and other RFCs referenced therein are referred to as syslog standards herein.

A syslog message includes a header and a (MSG). In some implementations, the syslog message includes a structured data payload. The header includes a string composed of print characters. In some embodiments, the header includes one or more of: a) PRI, a priority level; b) VERSION, a version number of the SYSLOG protocol; c) TIMESTAMP, a time stamp; d) HOSTNAME, a name of a host; e) APP-NAME, a name of an application; f) PROCID, an ID of a process; and e) MSGID, an ID of the message. The structured data payload includes a series of structured elements, each of which includes a structured element name and parameter name/value pairs. The MSG is free-text, usually used for describing an event. In some cases, RFC 5424 references other RFCs by the IETF to further define the formats for specific parts of the syslog message. RFC 5424, RFC 3164 and other RFCs referenced therein are referred to as syslog standards herein.

Cloud platform 102 pushes event records to the event logging protocol connector 106 based on an event selection configuration (e.g., a subscription). To this end, event logging protocol connector 106 comprises an interface (e.g., a graphical user interface, command line interface, or other interface) through which a user can specify an event logging configuration for event logging protocol connector 106. The event logging configuration can include, for example, event selection criteria and a data sink configuration. In some embodiments, the event logging configuration specifies one or more of the output formats to use, transformations to use, a data sink configuration, or a polling interval. The interface communicates with an application programming interface (API) of cloud platform to communicate the event selection criteria to cloud platform 102.

In operation, agents running on the endpoints report events of various event types to cloud platform 102. Cloud platform 102 pushes event records to the event logging protocol connector 106 based on the event selection criteria. Event logging protocol connector 106 translates the event records to event notification messages according to the output format and forwards the event notification messages to the selected data sink.

Compared to traditional approaches of collecting syslog messages, embodiments provide several advantages. Copies of the same agent can be deployed at multiple sites and to multiple tenants. The agents can be configured through configuration information, without changing the agent source code, to send event data for specific event types to cloud platform 102. Again, through configuration information, without changing the agent code, each agent can be associated with a group (e.g., a site) and a tenant (in multi-tenant architectures), allowing event data to be segregated by tenant and device groupings within the tenant, without requiring each enterprise to deploy a collector for each group in that enterprise, thus greatly reducing the hardware burden.

Embodiments of the present disclosure provide the advantages of cloud event data collection with a protocol connector that can translate event data to desired event notification message formats for storage to a data sink. This can enable, for example, an enterprise to use its legacy applications to analyze event notification messages (e.g., syslog messages).

Figure 2:
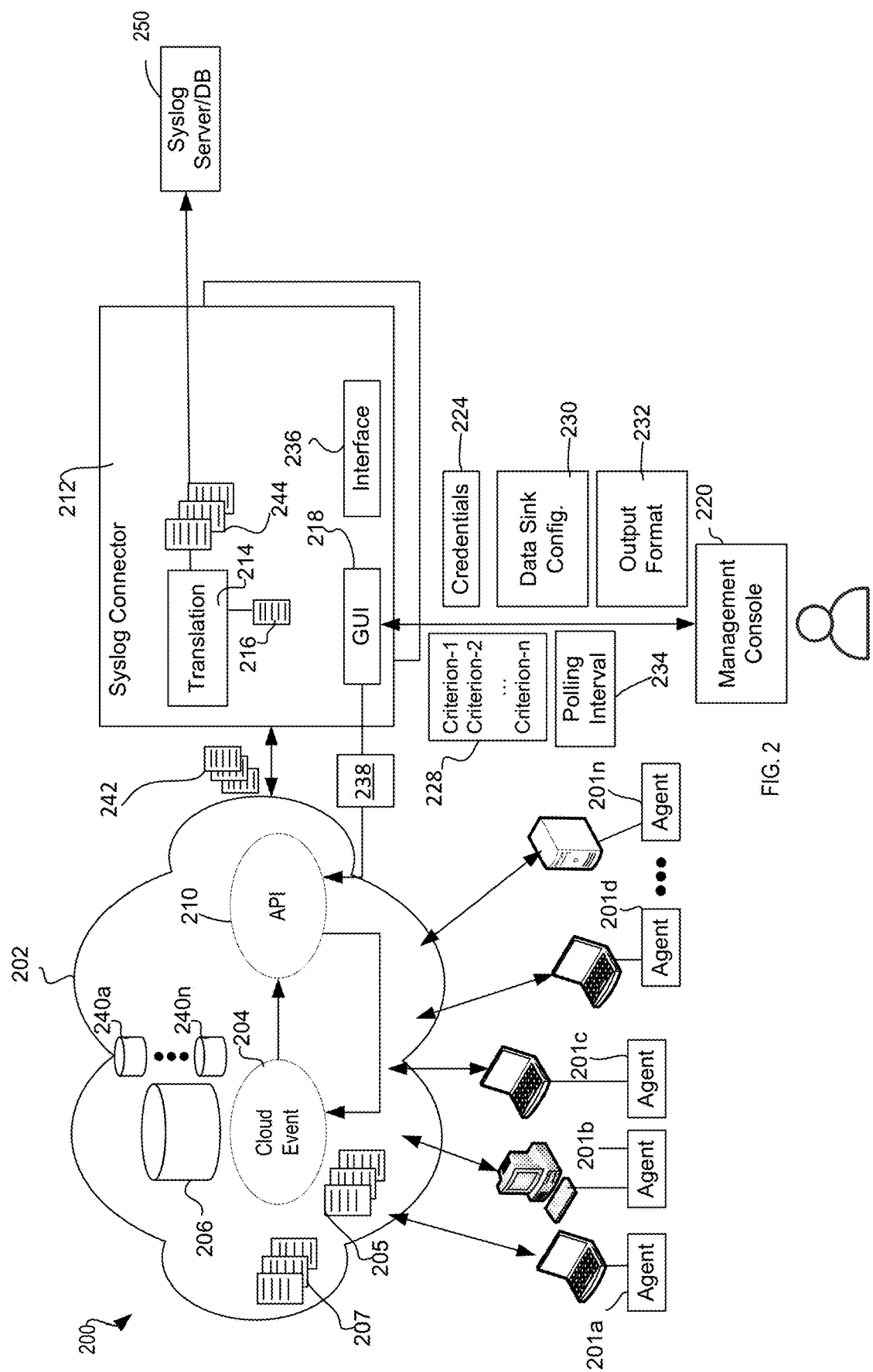
FIG. 2 is a diagrammatic representation of one embodiment of representation of an architecture for logging events.

FIG. 2 is a diagrammatic representation of one embodiment of representation of an architecture 200 for logging events. Architecture 200 includes a cloud platform 202 that executes a cloud event collector 204 that collects event records 205 from agents (e.g., agent 201a, agent 202b, agent 201c, agent 201d . . . agent 201n) deployed on endpoints (or at other locations) and stores event records in an event datastore 206. Each agent may have an associated group id (e.g., site id or other group id) and, in a multi-tenant environment, tenant id to allow data provided by the agents to be segregated by tenant and groups within a tenant. Cloud event collector 204 can also collect other types of events. For example, cloud event collector 204 can collect event records 207 for events that occur on the cloud platform.

Cloud platform 202 includes an API 210 through which cloud platform 202 pushes event records to event logging protocol connectors, such as syslog connector 212, based on associated event subscriptions. In addition, or in the alternative, the event logging protocol connectors can fetch event records from cloud platform 202 via API 210. In some embodiments, architecture 200 includes multiple event logging protocol connectors. For example, multiple tenants may deploy one or more event logging protocol connectors as needed or desired. In some embodiments, each event logging protocol connector executes on-prem at a respective tenant's facility.

The event records provided by cloud platform 202 to the event logging protocol connectors can include a variety of information about the respective events. By way of example, but not limitation, the event record for an event includes one or more of information that identifies the machine which originated the event data or on which the event occurred (e.g., host name of machine, host name and domain name for the machine, IP address of the machine), application identifier, such as application name or other identifier of the application that originated event data, process id, an event type to identify the type of event, structured data (name-value pairs) containing information about the event, free-form data that provides information about the event, a facility identifier or a severity level.

Turning to the event logging protocol connectors, syslog connector 212 is executable to receive events from cloud platform 202 and forward transformed events to a syslog data sink, such as syslog data sink 250. To this end, syslog connector comprises a translation layer 214 capable of translating events received from cloud platform 202 to various output formats.

The translation layer 214 translates event data received via API 210 to an output format 216, which is a syslog message format in the embodiment of FIG. 2. In general, the format of event data from cloud platform 202 for each event type to which syslog connector 212 can subscribe is known. Translation layer 214 is configured with transformations from the format used by cloud platform 202 to several output formats, where each output format corresponds to a different combination of syslog standards. In some embodiments, the output format 216 used to transform event records and, hence transformations applied, depends on the combination of RFCs that are applied, which may be specified in a configuration.

Syslog connector 212 includes a management interface 218, such as a GUI or other interface, for configuring event logging to a syslog data sink. Via the management interface, a user using a client application 220 provides credentials 224 for accessing event data from cloud platform 202 and an event logging configuration. Interactions between syslog connector 212 and cloud platform 202 to submit subscriptions and receive events can use the credentials 224.

The event logging configuration comprises event selection criteria 228. One example of an event selection criterion includes event type. For example, in one embodiment, management interface 218 allows the user to select event types from a list of available event types. Examples of event types include, but are not limited to, endpoint events, web threat shield events, backup events, domain name server events, console events, status events, user events, as well as events from external sources and servers which may themselves capture events.

Other examples of event selection criteria include, but are not limited, host information (e.g., hostname, IP address, IP address range), group (e.g., by site or other defined grouping), timestamps, denoting when an event occurred (e.g., time ranges, exact times).

The event logging configuration, according to one embodiment, includes a data sink configuration 230. For example, the event logging configuration may include the hostname, IP address or other information of the syslog data sink 250, such as a syslog server or other syslog sink to be used. In one embodiment, syslog data sink is a security information and event management (SIEM) server. Syslog connector 212 stores data sink configuration 230 for use in forwarding syslog messages to syslog data sink 250.

The event logging configuration, according to one embodiment, includes an output format selection 232. For example, in one embodiment, the user can specify which IETF RFCs are to be used by syslog connector 212. When transforming event records to syslog messages, syslog connector 212 will apply the transformations associated with the specified RFCs.

The event logging configuration, according to one embodiment, further includes a polling interval 234. The polling interval 234 specifies the interval that syslog connector 212 will use to poll the API 210 for additional event records.

In the illustrated embodiment, syslog connector 212 also includes a command line interface 236. According to one embodiment, command line interface 236 provides commands that allows syslog connector 212 to be executed from scripts or batch files.

Management interface 218 provides a subscription 238 to cloud platform 202. The subscription 238 includes the event selection criteria 228 from the event logging configuration. Cloud platform 202 uses subscription 238 to determine which event records it will provide to syslog connector 212.

According to one embodiment, cloud platform 202 maintains a connector event store for each subscription (for example connector event stores 240a . . . 240n are illustrated). For example, cloud platform 202 maintains connector event store 240a for subscription 238. The connector event stores 240a . . . 240n store event records that meet the event selection criteria of the corresponding subscriptions and act as inboxes for the connectors. In one embodiment, the connector event stores are logical constructs maintained through metadata on the event records. In another embodiment, the cloud platform 202 copies event records that meet the event selection criteria of a subscription to a different physical storage location that acts as the connector event store for a connector. Event records in an event store for a connector are assigned states such as unread or read.

In operation, a user provides credentials 224 and event selection criteria 228 via management interface 218, which provides subscription 238 to API 210. In response to receiving the subscription 238, cloud platform 202 creates an event store (e.g., connector event store 240a) for the subscription. In some embodiments, cloud event collector 204 evaluates existing event records in event datastore 206 against the event selection criteria of subscription 238, writes existing event records for events that meet the event selection criteria from event datastore 206 to connector event store 240a, and assign the event records added to connector event store 240a a state of "unread". In other embodiments, cloud event collector 204 only applies the subscription 238 to events received after subscription 238 is activated. As cloud event collector 204 receives event records 205, 207, cloud event collector stores the event records to event datastore 206. Further, cloud event collector 204 stores event records for events that meet the event selection criteria of subscription 238 to connector event store 240a and assigns the events a state "unread".

In some embodiments, cloud event collector 204 pushes unread event records from connector event store 240a to syslog connector 212 and marks the events as read in connector event store 240a. In other embodiments, syslog connector requests events from cloud platform 202 via API 210 (e.g., according to polling interval 234 or according to another data pull scheme). API 210 returns the unread event records from connector event store 240a to syslog connector 212 and marks the returned records as "read" in connector event store 240a.

Syslog connector 212 thus receives event records 242 formatted according to a format used by API 210. Translation layer 214 transforms event records 242 to the output format 216 to generate transformed event records 244. Even more particularly, translation layer 214 transforms event records 242 into syslog messages according to the syslog standards indicated by output format selection 232. Syslog connector 212 forwards the transformed event records 244 to syslog data sink 250 (e.g., a syslog server or other syslog sink) according to data sink configuration 230.

In the examples discussed above, cloud platform 202 collects events of various types and provides events to the connectors based on subscriptions. The subscriptions do not act as filters on the events collected by cloud platform 202, but on the events provided by cloud platform 202 to the connectors. In other embodiments, the subscriptions can be used to govern which events the cloud platform 202 collects in the first place. For example, if a subscription for a syslog connector associated with a particular tenant only specifies a subset of available event types, cloud platform 202 does not, in such an embodiment, collect events of other types from agents associated with that tenant.

Further, while FIG. 2 was described primarily using the example of endpoint events, syslog connector 212 can subscribe to other types of events, including cloud events or events that occur elsewhere in an architecture.

Some embodiments can be directed to security event transformation to process and transform security and like events collected from a variety of event sources. Such events are specified in a variety of proprietary and contextual ways particular to each external event environment. Embodiments transform such events into a standard event format capable of being received, processed, and analyzed by Security Information and Event Management (SIEM) Servers.

Figure 3:
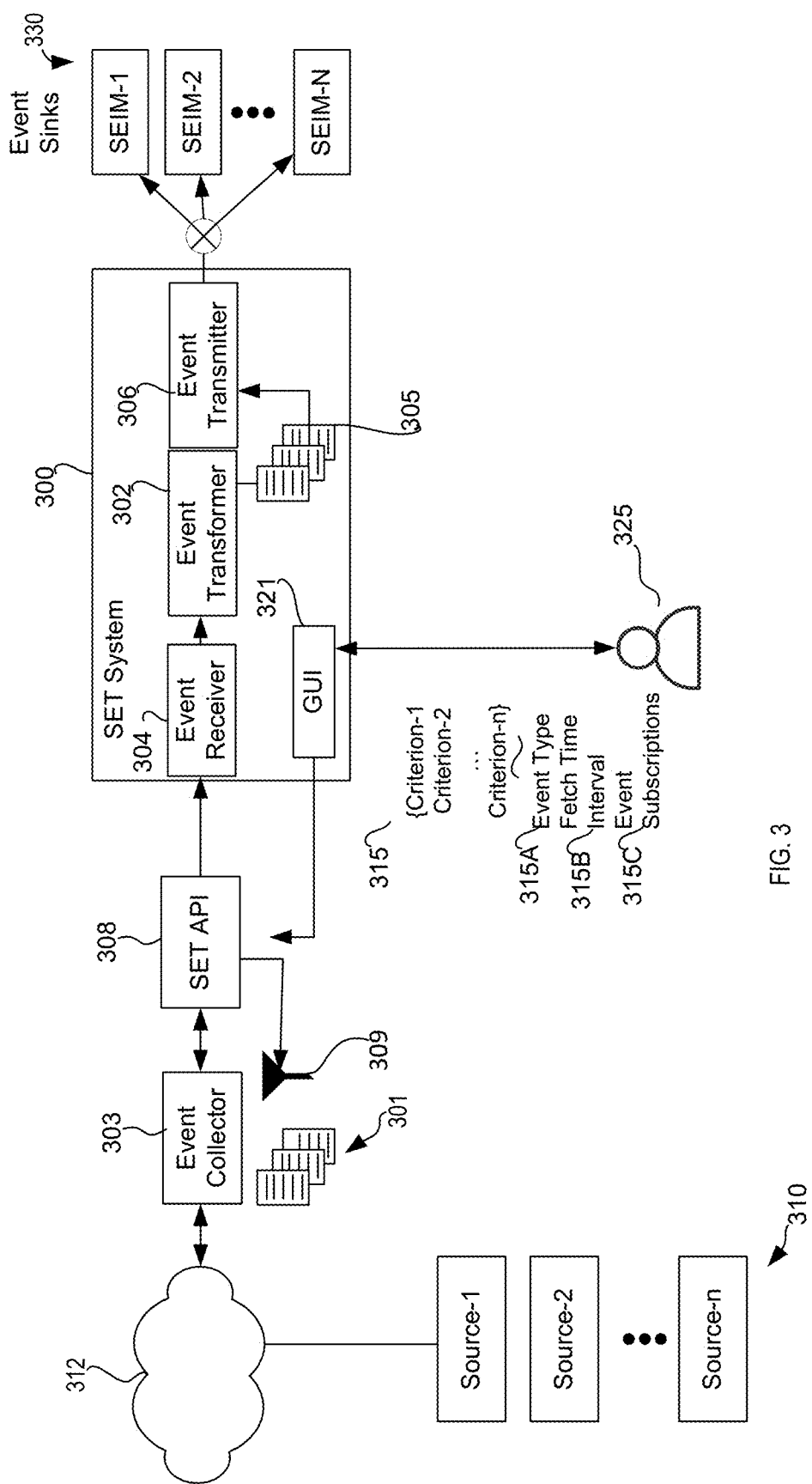
FIG. 3 is a diagrammatic representation of one embodiment of a system for security event transformation and logging.

Referring now to FIG. 3, in one embodiment, a system 300 executes a security event transformer 302 that receives security events 301 from an event collector 303. The security event transformer 302 transforms the security events 301 to a standard format to generate formatted security events 305. A security event receiver 304 receives the security events 301 from the event collector 303 and is coupled to the security event transformer 302. The security event receiver 304 forwards the security events 301 to the security event transformer 302. A security event transmitter 306 is coupled to the security event transformer 302 to receive the plurality of formatted security events 305 from the security event transformer 302 and transmit the formatted security events 305 to a SIEM server 330 (which may include SIEM-1, SIEM-2, up to SIEM-N).

In certain applications of the security event transformation system 300, only events 301 that match one or more criteria 315 (which may include CRITERION-1, CRITERION-2, up to CRITERION-N) are desired and/or needed. The security event receiver 304 is configured to receive input to select the one or more criteria 315 relevant to the application to receive from the event collector 303, which are then formatted and passed to the SIEM Server 330. In one embodiment in which only one or more events are desired and/or types 315A needed, a user 325 (who may be a security administrator authenticated to configure the system) inputs the event type 315A to configure the security event transformation system 300 to collect a subset of events 301 matching the inputted event type 315A from the event collector 303. In some embodiments, a GUI 321 may be employed to present configuration and system information to the user 325 and enable user 325 to select and input the event criteria 315. Event types 315A include, but are not limited to, endpoint threat events (an example of which is described herein below), web threat shield events, backup event, domain name server events, console event, status events, user events, as well as events from external sources and servers which may themselves capture events.

The system 300 may employ a variety of methods to receive security events 301. One embodiment pushes security events 301 from the event collector 303 to the system 300. The system 300 is configured to collect events 301 matching one or more criteria 315 and, in turn, the event collector 303 pushes only those events 301 to the system that match to one or more criteria. For example, in one non-limiting push event embodiment, the event collector 303 collects events 301, filters out the events (as designed by reference numeral 309) that do not match the event type, and forwards the matching events to the system 300. Such filtering 309 and forwarding may be ongoing as the event collector 303 collects more events 301 and can occur at various intervals and based on certain parameters and real-time operations. Such intervals may be configurable, such as by a user 325, or may be automatically determined based on the number of incoming events 301 and those that match the one or more criteria 315.

The security events 301 comprise event and system configuration attributes including, but not limited to, event type, event timestamp denoting the time an event occurred, IP address and/or host name that designate IP information for various servers, Request for Comment (RFC) denoting a reference to a set of standards such as those created by the Internet Engineering Task Force, polling interval which may comprise a fetch time interval, and site selection.

In another embodiment, the system 300 fetches the events 301 from the event collector 303. Again, the system 300 is configured to collect events 301 matching one or more criteria 315, however the system fetches the matching events from the event collector 303. A fetch time interval 315B may be configurable such that the system 300 requests events 301 at the fetch time interval 315B, receiving the matching events 301 and processing such events as they arrive. The fetch time interval 315B may be inputted by a user 325 and/or automatically set based on certain parameters and real-time operations. For example, the fetch time interval 315B may be lowered so that the system 300 is more responsive, such as when a high volume of matching events is being collected.

In another embodiment, the event type 315A includes endpoint events and the event collector 303 collects a corpus of events from one or more sources 310 (which may include sources SOURCE-1, SOURCE-2 up to SOURCE-N) where security monitoring is to occur. The event collector 303 is coupled over a network 312 to the one or more endpoints or other data sources 310. In turn, the system 300 receives the endpoint events, transforms, and transmits the standard formatted events 305 to the SIEM Server 330.

Furthermore, in some embodiments, a Security Event Application Programming Interface (Security API) 308 (which may be referred to as a "Unity API") is coupled between the event collector 303 and the system 300. The Security API 308 receives the input, a non-limiting example of which includes input for selecting one or more event types 315A and input for one or more event subscriptions 315C. The one or more event subscriptions 315C describe attributes of events 301 within the corpus of events desired and/or needed for the system 300 to receive, transform, and transmit to the SIEM server 330.

It should be noted that the event collector 303 may comprise several event collectors, each event collector 303 configured to collect events 301 from a different source 310, such as an endpoint where security is to be monitored.

It should further be noted that the system 300 may comprise several security event transformation (SET) systems to interactively load balance and/or meet the demands of a volume of incoming events 301 or a high number of event collectors 303. An input load balancer may direct incoming events 301 to certain SET systems and an output load balancer may direct the standard formatted security events 305 to the SIEM Server 330.

Moreover, the SIEM server 330 may be a plurality of SIEM servers (shown as SIEM-1, SIEM-2, up to SIEM-N). Each of the SIEM Servers can receive, process, and analyze the standard formatted security events 305 generated by the system 300. In this way, advantageously, security events 301 which may be specified in a variety of proprietary and contextual ways particular to each external event environment may be transformed into a standard format and received at the SIEM Servers 330 (which are also proprietary and process and analyze security events 301 in different ways and for different purposes). This provides significant time and resources savings for not only deployment of event collection systems and methodologies (within sources 310), but also in deployment of event consumers (such as SIEM Servers 330), which may be referred to as data sinks. Because the SIEM Servers 330 can process the standard formatted security events 305, they are advantageously agnostic to the various event sources proprietary specifications and therefore, the inventive security event transformation described herein enables a high degree of transparency in coupling event collection sources to event processing sinks.

Figure 4:
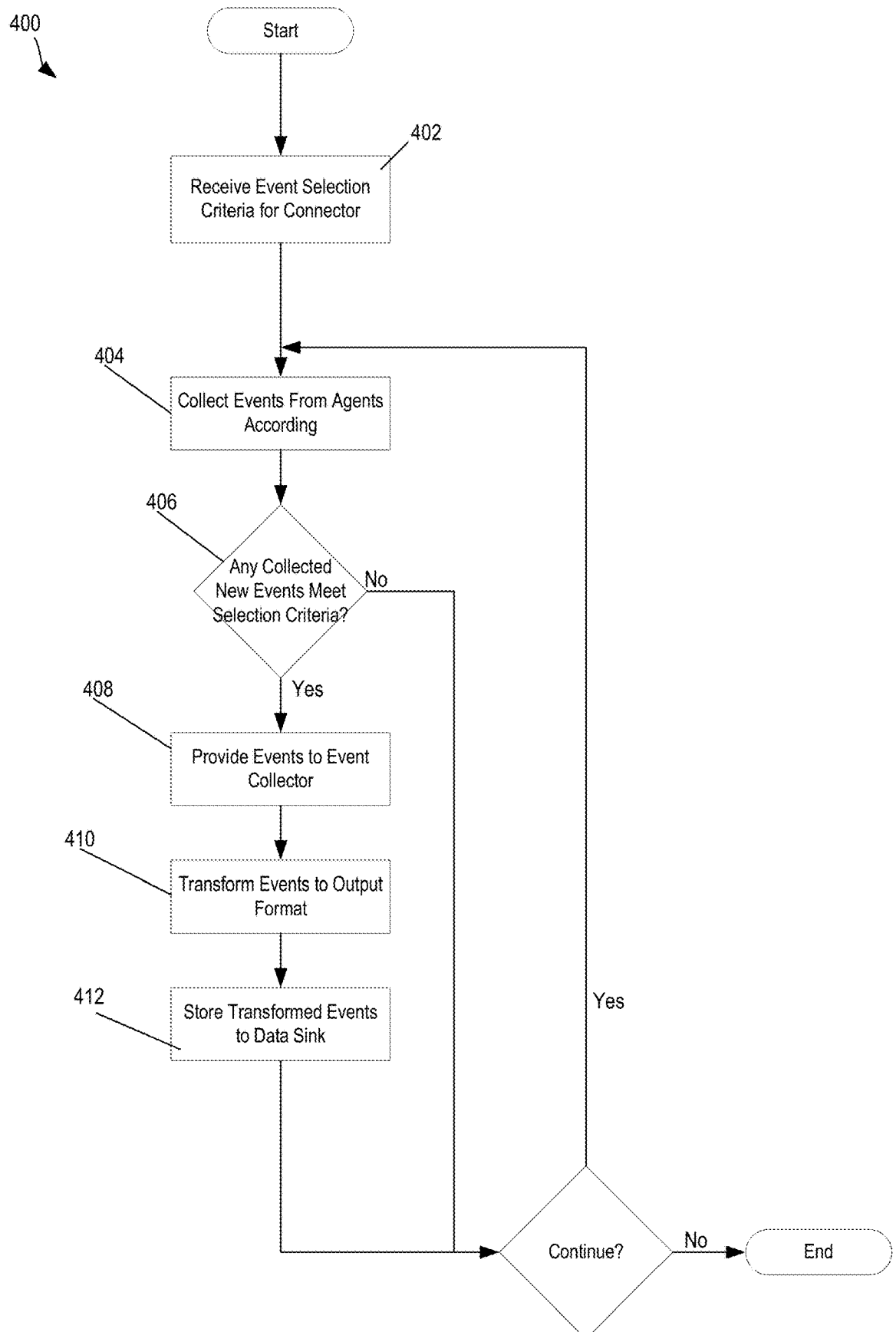
FIG. 4 is a flowchart illustrating one embodiment of a method for logging events.

FIG. 4 is a flowchart illustrating one embodiment of a method 400 for logging events. In one embodiment, the steps of FIG. 4 may be embodied as computer-executable instructions stored on a non-transitory, computer-readable medium. At step 402, an event collection system, such as cloud platform 202, receives an event selection configuration, such as subscription 238, that specifies criteria for selecting events to provide to an event logging protocol connector. At step 404, the event collection system collects events of various types (e.g., from endpoint agents or other sources). For example, cloud event collector 204 collects event records 205 from agents (e.g., agent 201a, agent 201b, agent 201c, agent 201d . . . agent 201n) and event records 207 from other data sources and stores the event records. At step 406, the event collection system determines if any of the collected events meet the event selection criteria provided by an event logging protocol connector. For example, cloud platform 202 determines if any of the collected event records 205, 207 meet the criteria specified in subscription 238. If so, the event collection system provides the events to the event logging protocol connector (step 408). For example, cloud platform 202 provides event records 242 for events that meet the selection criteria of subscription 238 to syslog connector 212. At step 410, the event logging protocol connector transforms the received events from the format used by the event collection system to an output format. For example, translation layer 214 of syslog connector 212 transforms received event records 242 into syslog messages according to a selected output format 216. At step 412, the event protocol connector stores the transformed messages to a data sink. For example, syslog connector 212 stores transformed event records 244—that is, the syslog messages—to data sink 235—for example, as a syslog file.

FIG. 4 is merely an illustrative example, and the disclosed subject matter is not limited to the ordering or number of steps illustrated. Embodiments may implement additional steps or alternative steps, omit steps, or repeat steps.

Figure 5:
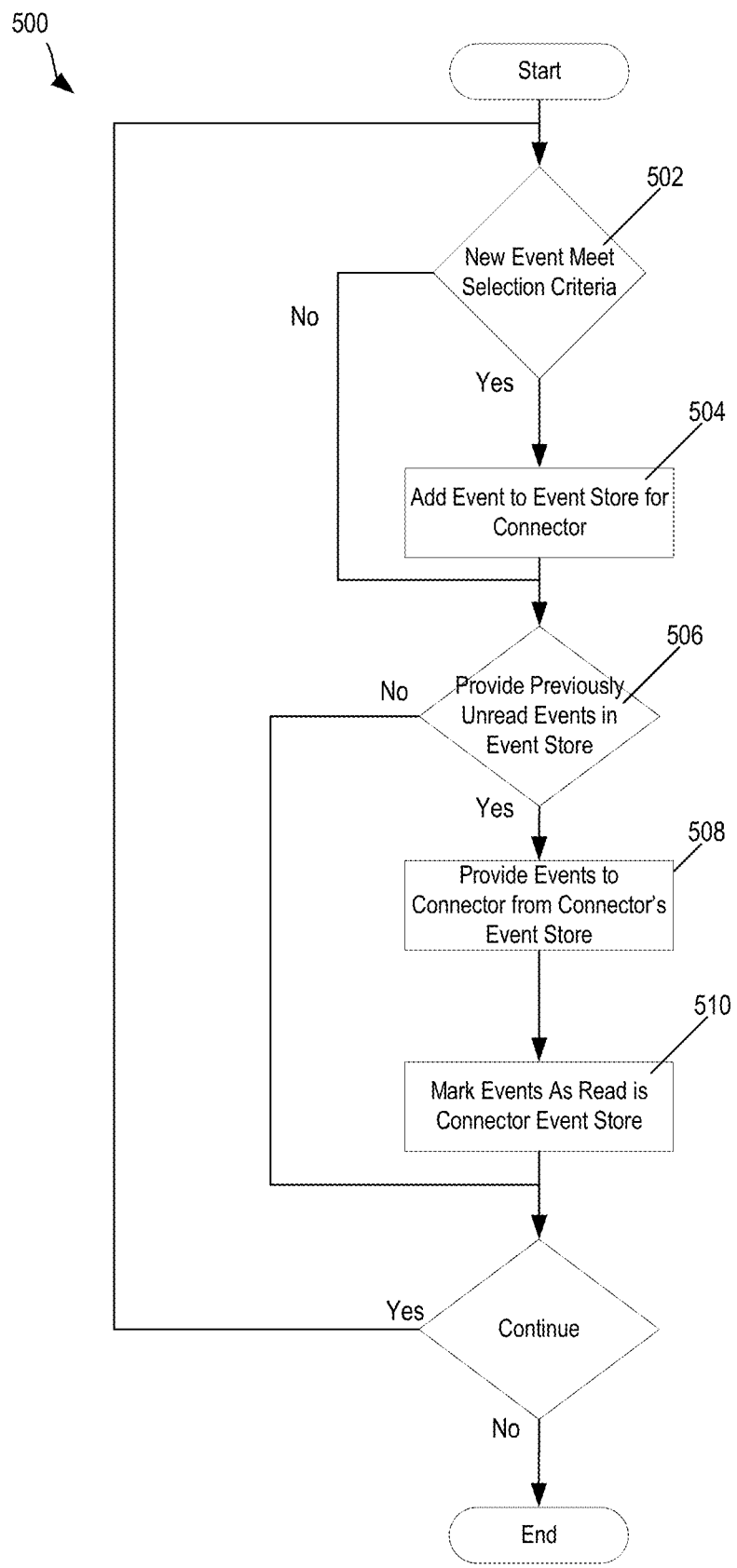
FIG. 5 is a flowchart illustrating one embodiment of a method for providing events to a connector.

FIG. 5 is a flowchart illustrating one embodiment of a method 500 for providing events to a connector. In one embodiment, the steps of FIG. 5 may be embodied as computer-executable instructions stored on a non-transitory, computer-readable medium.

At step 502, an event collection system determines if a new event meets event selection criteria. For example, cloud platform 202 determines if an event record 205 meets the event selection criteria of subscription 238. If the event does not meet the event selection criteria, control can pass to step 506. If the event meets the event selection criteria for an event logging connector, the event collection system adds the event to an event store for the event logging connector (step 504). For example, if an event record 205, 207 meets the event selection criteria of subscription 238, cloud platform 202 adds an event record for the event to connector event store 240a for syslog connector 212 and marks the event as unread in the connector event store 240a.

At step 506, the event collection system determines whether to provide previously unread events from a connector event store to the connector. Step 506 may be performed, for example, in response to the connector requesting unread events or based on rules for pushing events to the connector. For example, cloud platform 202 determines if there are unread events in connector event store 240a. This may be done, for example, in response to syslog connector 212 requesting events or based on rules for pushing events to syslog connector 212. If there are unread events to provide to the event logging protocol connector, the event collection system provides the unread events to the event logging protocol connector (step 508) and marks the events as read in the connector's event store (step 510). For example, if cloud platform 202 determines that there are unread event records in connector event store 240a, cloud platform 202 sends the unread event records to syslog connector 212 and marks the event records as read. Method 500 can continue until a stopping condition is met.

FIG. 5 is merely an illustrative example, and the disclosed subject matter is not limited to the ordering or number of steps illustrated. Embodiments may implement additional steps or alternative steps, omit steps, or repeat steps.

Figure 6:
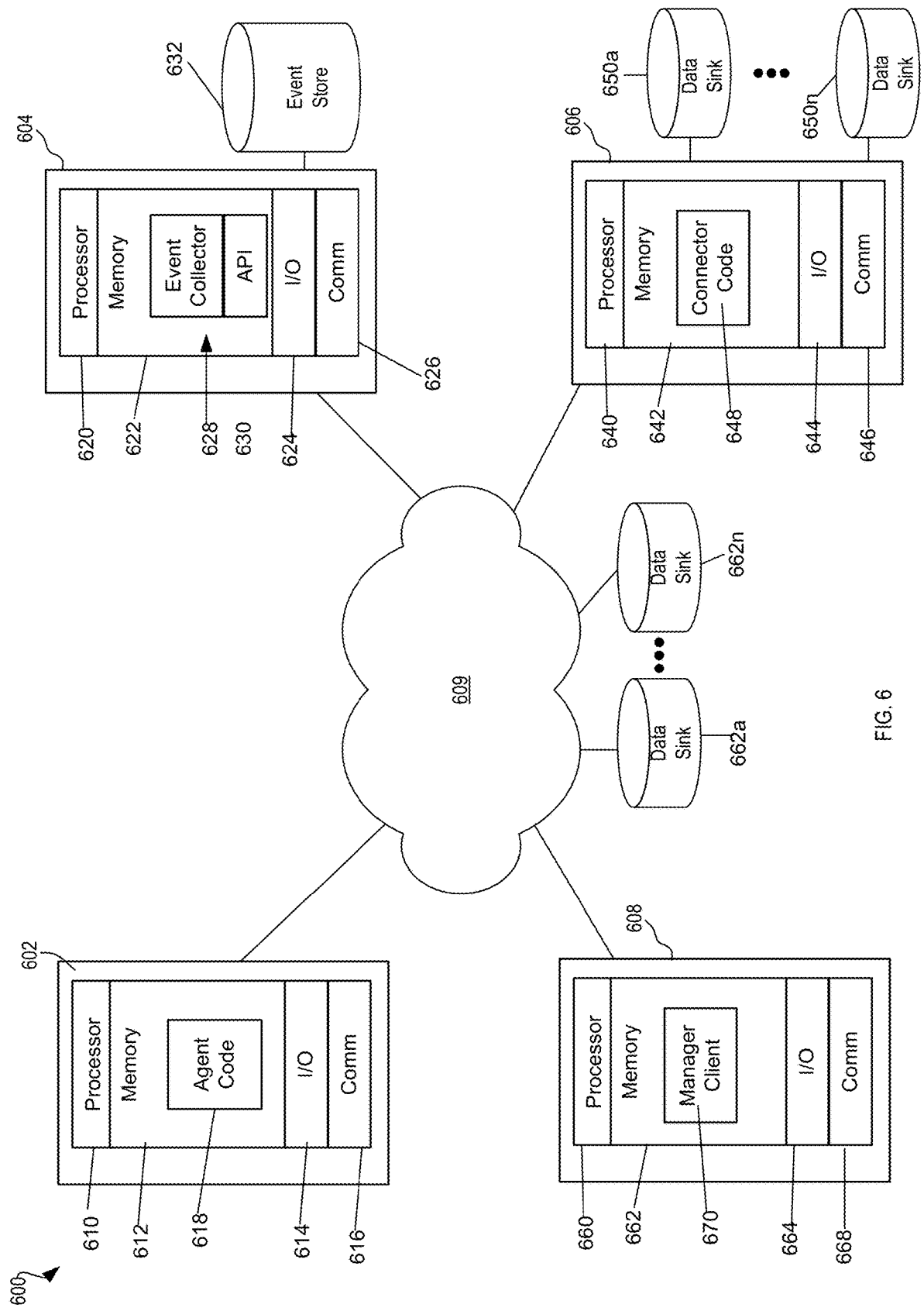
FIG. 6 depicts a diagrammatic representation of a distributed network computing environment where embodiments disclosed herein can be implemented.

FIG. 6 depicts a diagrammatic representation of a distributed network computing environment where embodiments disclosed herein can be implemented. In the example illustrated, network computing environment 600 includes an endpoint 602, a server computer system 604, a connector computer system 606, and a management computer system 608 bidirectionally coupled over a network 609, which can include a combination of networks. While only one endpoint 602, server computer system 604, a connector computer system 606, and management computer system 608, there may be multiple endpoints, server computers, connector computers and management computers in network computing environment 600.

Endpoint computer 602 comprises a computer processor 610 and associated memory 612. Computer processor 610 may be an integrated circuit for processing instructions, such as, but not limited to a central processing unit (CPU). Memory 612 may include volatile memory, non-volatile memory, semi-volatile memory or a combination thereof. Memory 612, for example, may include RAM, ROM, flash memory, a hard disk drive, a solid-state drive, an optical storage medium (e.g., CD-ROM), or other computer readable memory or combination thereof. Memory 612 implements a storage hierarchy that includes cache memory, primary memory and secondary memory. In some embodiments, memory 612 may include storage space on a data storage array. Endpoint 602 may also include input/output ("I/O") devices 614, and a communication interface 616, such as a network interface card, to interface with network 609.

According to one embodiment, endpoint 602 includes executable instructions 618 stored on a non-transitory computer readable medium coupled to computer processor 610. The computer executable instructions of endpoint 602 are executable to provide an agent to send events (event records) to an event collector of server computer system 604.

Server computer system 604 comprises a computer processor 620 and associated memory 622. Computer processor 620 may be an integrated circuit for processing instructions, such as, but not limited to a CPU. Memory 622 may include volatile memory, non-volatile memory, semi-volatile memory or a combination thereof. Memory 622, for example, may include RAM, ROM, flash memory, a hard disk drive, a solid-state drive, an optical storage medium (e.g., CD-ROM), or other computer readable memory or combination thereof. Memory 622 implements a storage hierarchy that includes cache memory, primary memory and secondary memory. In some embodiments, memory 622 may include storage space on a data storage array. Server computer system 604 may also include I/O devices 624 and a communication interface 626, such as a network interface card, to interface with network 609. In some embodiments, server computer system 604 is a cloud computing system.

According to one embodiment, server computer system 604 includes executable instructions 628 stored on a non-transitory computer readable medium coupled to computer processor 620. The computer executable instructions of server computer system 604 are executable to provide an event collection system. In some embodiments, the computer executable instructions 628 are executable to provide an event collector and an API. In an even more particular embodiment, the computer executable instructions 628 are executable to provide a cloud event collector (e.g., cloud event collector 204) and associated API (e.g., API 210). In some embodiments, server computer system 604 includes a database, a file system, or other type of datastore or combination of datastores that acts as an event datastore 632 (e.g., event datastore 206 and connector event stores).

Connector computer system 606 comprises a computer processor 640 and associated memory 642. Computer processor 640 may be an integrated circuit for processing instructions, such as, but not limited to a CPU. Memory 642 may include volatile memory, non-volatile memory, semi-volatile memory or a combination thereof. Memory 642, for example, may include RAM, ROM, flash memory, a hard disk drive, a solid-state drive, an optical storage medium (e.g., CD-ROM), or other computer readable memory or combination thereof. Memory 642 implements a storage hierarchy that includes cache memory, primary memory and secondary memory. In some embodiments, memory 642 may include storage space on a data storage array. Connector computer system 606 may also include input/output I/O devices 644 and a communication interface 646, such as a network interface card, to interface with network 609. In some embodiments, connector computer system 606 is an on-premises computer system.

According to one embodiment, connector computer system 606 includes executable instructions 648 stored on a non-transitory computer readable medium coupled to computer processor 640. The computer executable instructions of connector computer system 606 are executable to provide an event logging protocol connector, such as syslog connector 212. In some embodiments, the computer executable instructions 648 are executable to forward transformed event records to data sinks 650a . . . 650n.

Management computer system 608 comprises a computer processor 660 and associated memory 662. Computer processor 660 may be an integrated circuit for processing instructions, such as, but not limited to a CPU. Memory 662 may include volatile memory, non-volatile memory, semi-volatile memory or a combination thereof. Memory 662, for example, may include RAM, ROM, flash memory, a hard disk drive, a solid-state drive, an optical storage medium (e.g., CD-ROM), or other computer readable memory or combination thereof. Memory 662 implements a storage hierarchy that includes cache memory, primary memory and secondary memory. In some embodiments, memory 662 may include storage space on a data storage array. Management computer system 608 may also include input/output I/O devices 664 and a communication interface 668, such as a network interface card, to interface with network 609.

According to one embodiment, management computer system 608 includes executable instructions 670 stored on a non-transitory computer readable medium coupled to computer processor 660. The computer executable instructions of management computer system 608 are executable to provide a management client for the user. The management client allows the user to access the management interface of the connector.

Portions of the methods described herein may be implemented in suitable software code that may reside within RAM, ROM, a hard drive or other non-transitory storage medium. Alternatively, the instructions may be stored as software code elements on a data storage array, magnetic tape, floppy diskette, optical storage device, or other appropriate data processing system readable medium or storage device.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random-access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine-readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A computer-implemented method comprising:
providing, by a syslog connector, a subscription to a cloud source that collects events from a plurality of data sources, the subscription comprising an event selection criterion;
receiving, by the syslog connector, event records from the cloud source according to the subscription, the received event records formatted according to a first format;
determining to use an output format from a plurality of supported syslog formats for the received event records;
transforming, by the syslog connector, the event records received from the cloud source from the first format to syslog messages according to output format from the plurality of supported syslog formats; and
storing, by the syslog connector, the syslog messages to a syslog data sink.

2. The computer-implemented method of claim 1, wherein the syslog connector is an on-premises syslog connector.

3. The computer-implemented method of claim 1, wherein the event records are pushed from the cloud source to the syslog connector.

4. The computer-implemented method of claim 1, wherein the event records are pulled by the syslog connector from the cloud source.

5. The computer-implemented method of claim 1, further comprising:
receiving, by the syslog connector, an event logging configuration, the event logging configuration comprising the event selection criterion and a data sink configuration for the syslog data sink.

6. The computer-implemented method of claim 5, wherein the event logging configuration further comprises a polling interval and wherein the syslog connector polls the cloud source for additional event records according to the polling interval.

7. The computer-implemented method of claim 1, further comprising:
establishing an event store for the subscription;
evaluating a new event to determine that the new event is subscribed to according to the subscription;
based on the determination that the new event is subscribed to according to the subscription, add an event record for the new event to the event store for the subscription as an unread event record; and
sending the unread event record to the syslog connector and changing the unread event record to a read event record.

8. The computer-implemented method of claim 7, wherein the unread event record is pushed to the syslog connector.

9. The computer-implemented method of claim 7, wherein the unread event record is sent to the syslog connector responsive to the syslog connector pulling the unread event record.

10. The computer-implemented method of claim 1, wherein storing the syslog messages to the syslog data sink comprises sending a syslog file containing the syslog messages to the syslog data sink.

11. A computer program product comprising a non-transitory, computer-readable medium storing thereon computer-executable instructions, the computer-executable instructions comprising instructions for:
providing a subscription to a cloud source that collects events from a plurality of data sources, the subscription comprising an event selection criterion;
receiving event records from the cloud source according to the subscription, the received event records formatted according to a first format;
determining to use an output format from a plurality of supported syslog formats for the received event records;
transforming the received event records from the first format to syslog messages according to the output format; and
storing the syslog messages to a syslog data sink.

12. The computer program product of claim 11, wherein the event records are received from the cloud source because of being pushed from the cloud source.

13. The computer program product of claim 11, further comprising instructions for pulling the event records from the cloud source.

14. The computer program product of claim 11, wherein the computer-executable instructions further comprise instructions for receiving an event logging configuration, the event logging configuration comprising the event selection criterion and a data sink configuration for the syslog data sink.

15. The computer program product of claim 14, wherein the event logging configuration further comprises a polling interval and wherein the computer-executable instructions further comprise instructions for polling the cloud source for new event records according to the polling interval.

16. The computer program product of claim 11, wherein storing the syslog messages to the syslog data sink comprises sending a syslog file containing the syslog messages to the syslog data sink.

17. An event logging system comprising:
a first processor;
a first non-transitory, computer-readable medium storing thereon first computer-executable instructions that are executable by the first processor, the first computer-executable instructions comprising instructions for:
providing a subscription to a cloud source that collects events from a plurality of data sources, the subscription comprising an event selection criterion;
receiving event records from the cloud source according to the subscription, the received event records formatted according to a first format;
determining to use an output format from a plurality of supported syslog formats for the received event records;
transforming the received event records from the first format to syslog messages according to the output format; and
storing the syslog messages to a syslog data sink;
a second processor; and
a second non-transitory, computer-readable medium storing thereon second computer-executable instructions that are executable by the second processor, the second computer-executable instructions comprising instructions for:
establishing an event store for the subscription;
determining that a new event is subscribed to according to the subscription;
based on the determination that the new event is a subscribed to according to the subscription, adding an unread event record for the new event to the event store for the subscription; and
sending the unread event record to the first processor and changing the unread event record to a read event record in the event store for the subscription.

18. The event logging system of claim 17, wherein the second computer-executable instructions comprise instructions executable by the second processor for pushing the unread event record to the first processor.

19. The event logging system of claim 17, wherein the first computer-executable instructions comprise instructions executable by the first processor for pulling the unread event record.

20. The event logging system of claim 19, wherein the second computer-executable instructions comprise instructions executable by the second processor for sending the unread event record to the first processor responsive to the first processor pulling the unread event record.

21. The computer-implemented method of claim 1, further comprising accessing an output format selection associated with the subscription, the output format selection indicating the output format, wherein the syslog connector comprises a plurality of transformations for translating from the first format used by the cloud source to the plurality of supported syslog formats.

22. The computer program product of claim 11, wherein the computer-executable instructions further comprise instructions for accessing an output format selection associated with the subscription, the output format selection indicating the output format.

23. The event logging system of claim 17, wherein the first computer-executable instructions comprise instructions for accessing an output format selection associated with the subscription, the output format selection indicating the output format.

* * * * *